(12) United States Patent
Wang et al.

(10) Patent No.: US 8,289,920 B2
(45) Date of Patent: *Oct. 16, 2012

(54) METHOD AND APPARATUS FOR HANDOFF BETWEEN ACCESS SYSTEMS

(75) Inventors: Jun Wang, La Jolla, CA (US); Edward G. Tiedemann, Jr., Concord, MA (US); John Wallace Nasielski, San Diego, CA (US); Kalle I. Ahmavaara, San Diego, CA (US); Lorenzo Casaccia, Rome (IL); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 760 days.

This patent is subject to a terminal disclaimer.

(21) Appl. No.: 12/047,234

(22) Filed: Mar. 12, 2008

(65) Prior Publication Data

US 2008/0259869 A1   Oct. 23, 2008

Related U.S. Application Data

(60) Provisional application No. 60/895,365, filed on Mar. 16, 2007.

(51) Int. Cl.
*H04W 4/00* (2009.01)
(52) U.S. Cl. .................... 370/331; 455/436
(58) Field of Classification Search .............. None
See application file for complete search history.

(56) References Cited

U.S. PATENT DOCUMENTS

| 7,978,683 | B2 | 7/2011 | Balogh et al. | |
| 2002/0194385 | A1 | 12/2002 | Linder et al. | |
| 2003/0104814 | A1* | 6/2003 | Gwon et al. | 455/436 |
| 2003/0125027 | A1 | 7/2003 | Gwon et al. | 455/436 |
| 2004/0008632 | A1 | 1/2004 | Hsu et al. | |
| 2004/0125795 | A1 | 7/2004 | Corson et al. | |
| 2004/0203787 | A1 | 10/2004 | Naghian | |
| 2005/0143072 | A1 | 6/2005 | Yoon et al. | |
| 2005/0272432 | A1 | 12/2005 | Ji et al. | 455/449 |
| 2006/0045049 | A1 | 3/2006 | Chung et al. | 370/331 |
| 2006/0046728 | A1* | 3/2006 | Jung et al. | 455/445 |
| 2006/0072512 | A1* | 4/2006 | Das et al. | 370/335 |
| 2006/0099949 | A1 | 5/2006 | Jung et al. | |

(Continued)

FOREIGN PATENT DOCUMENTS

EP   1441483 A2   7/2004

(Continued)

OTHER PUBLICATIONS

International Search Report—PCT/US08/056801—International Search Authority, European Patent Office—Jul. 30, 2008.

(Continued)

*Primary Examiner* — Chi H. Pham
*Assistant Examiner* — Shick Hom
(74) *Attorney, Agent, or Firm* — François A. Pelaez

(57) ABSTRACT

Systems and methods for switching among networks (e.g., heterogeneous) and inter-working between a source access system and a target access system, by implementing tunneling from the AT to the target access system via the source access system. An inter-system handoff control component can facilitate setting tunneling by the mobile unit to the target access and/or between the source access system and the target access system—wherein signaling/packeting associated with the target system can be transferred over the source system.

48 Claims, 11 Drawing Sheets

U.S. PATENT DOCUMENTS

| | | | |
|---|---|---|---|
| 2006/0114871 A1 | 6/2006 | Buckley et al. | |
| 2006/0126565 A1 | 6/2006 | Shaheen | |
| 2006/0140150 A1 | 6/2006 | Olvera-Hernandez et al. | |
| 2006/0203774 A1 | 9/2006 | Carrion-Rodrigo | |
| 2007/0036109 A1* | 2/2007 | Kwak et al. | 370/331 |
| 2007/0160049 A1 | 7/2007 | Xie et al. | |
| 2007/0165574 A1* | 7/2007 | Srey et al. | 370/331 |
| 2007/0177585 A1 | 8/2007 | El Mghazli et al. | |
| 2007/0254625 A1 | 11/2007 | Edge | |
| 2008/0089272 A1 | 4/2008 | Ahokangas | |
| 2008/0089287 A1 | 4/2008 | Sagfors et al. | |
| 2008/0092224 A1 | 4/2008 | Coulas et al. | |
| 2008/0165740 A1 | 7/2008 | Bachmann et al. | |
| 2008/0281978 A1 | 11/2008 | Tang et al. | |
| 2008/0318575 A1* | 12/2008 | Ulupinar et al. | 455/436 |
| 2009/0016300 A1* | 1/2009 | Ahmavaara et al. | 370/331 |
| 2009/0040981 A1* | 2/2009 | Agashe et al. | 370/331 |
| 2009/0111468 A1 | 4/2009 | Burgess et al. | |
| 2009/0176489 A1 | 7/2009 | Ulupinar et al. | |
| 2009/0201878 A1 | 8/2009 | Kotecha et al. | |
| 2009/0202966 A1* | 8/2009 | Teicher et al. | 434/236 |
| 2009/0258631 A1 | 10/2009 | Forsberg et al. | 455/411 |
| 2009/0271623 A1 | 10/2009 | Forsberg et al. | |
| 2009/0286527 A1 | 11/2009 | Cheon et al. | |
| 2009/0303966 A1 | 12/2009 | Cherian et al. | |
| 2010/0061340 A1* | 3/2010 | Ramle et al. | 370/331 |
| 2011/0044198 A1 | 2/2011 | Persson et al. | 370/252 |

FOREIGN PATENT DOCUMENTS

| | | |
|---|---|---|
| EP | 1746856 A1 | 1/2007 |
| JP | 2008503108 A | 1/2008 |
| JP | 2008507875 A | 3/2008 |
| JP | 2008519568 A | 6/2008 |
| JP | 2010534999 A | 11/2010 |
| KR | 20060124397 A | 12/2006 |
| KR | 20070046012 A | 5/2007 |
| RU | 2004137498 A | 6/2005 |
| RU | 2265282 C2 | 11/2005 |
| TW | 535450 B | 6/2003 |
| TW | 200541248 | 12/2005 |
| TW | M294789 U | 7/2006 |
| WO | WO2005036804 A2 | 4/2005 |
| WO | WO2006011053 A1 | 2/2006 |
| WO | WO2006049464 A1 | 5/2006 |
| WO | WO2006052563 A2 | 5/2006 |
| WO | WO2006083039 | 8/2006 |
| WO | WO2006102650 A1 | 9/2006 |
| WO | 2007/007990 | 1/2007 |
| WO | WO2008157633 | 12/2008 |
| WO | WO2009002586 A2 | 12/2008 |
| WO | WO2009012191 A2 | 1/2009 |
| WO | WO2009037623 A2 | 3/2009 |
| WO | WO2009154640 A2 | 12/2009 |

OTHER PUBLICATIONS

Written Opinion—PCT/US08/056801—International Search Authority, European Patent Office—Jul. 30, 2008.
"3GPP TS 36.300 V0.9.0 Evolved Universal Terrestrial Radio Access (E-UTRA) and Evolved Universal Terrestrial Radio Access Network (E-UTRAN); Overall description," 3GPP Technical Specification Group Radio Access Network, [Online] Mar. 4, 2007, p. 49.
"3GPP TR 23.882 V1.8.0 3GPP System Architecture Evolution: Report on Technical Options and Conclusions (Release 7)," 3GPP Technical Specification Group Services and System Aspects, [Online] Feb. 21, 2007.
3GPP2: "UMB and HRPD/Ix Interworking, X.S0054-610-0 Version 1.0" 3GPP2, [Online] Aug. 29, 2008, pp. 1-60, XP002529917 Retrieved from the Internet: 3gpp2.org/Public_html/specs /X.S0054-610-0_v1.0_080909.pdf> paragraphs [003.]-[5.1.3.].
Dutta, A. et al.: Columbia Univ: "A Framework of Media-Independent Pre-Authentication (MPA); draft-ohba-mobopts-mpa-framework-OO.txt" IETF Standard-Working-Draft, Internet Engineering Task Force, IETF, CH, Feb. 13, 2005, pp. 1-39, XP015039521 ISSN: 0000-0004 paragraphs [4.1.]-[4.3.] paragraph [5.4.].
"Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.1.0 Release 8); ETSI TS 136 300" ETSI Standards, LIS, Sophia Antipolis Cedex, France, vol. 3-R2, No. V8.1. 0, Jun. 1, 2007, pp. 1-107, XP014038500 ISSN: 0000-0001 paragraph [8.2.] paragraphs [010.]-[10.2.2.].
Stamoulis A et al., "Space-Time Block-Coded OFDMA with Linear Precoding for Multirate Services" IEEE Transactions on Signal Processing, Jan. 1, 2002 IEEE Service Center, New York, NY, US, vol. 50,Nr:1, pp. 119-129, Jan. 2002, XP001200909.
3GPP: "Optimized Handover Procedures and Protocols between EUTRAN Access and cdma2000 HRPD Acess—Stage 3 (Release 8)" 3rd Generation Partnerschip Project;Technical Specification Group Core Network and Terminals; 3GPP Evolved Packet Systems, Jun. 6, 2008, pp. 1-21, XP002542969 Chapter 1; p. 7 Chapter 4; p. 8 Chapters 7.3-7.3.3; pp. 10-12 Chapter 7.5.6; p. 17.
"3rd Generation Partnership Project; Technical Specification Group Core Network and Terminals;3GPP System Architecture Evolution ; CT WG1 Aspects(Release 8)" 3GPP Draft; 24801-100, 3rd Generation Partnership Project (3GPP), Mobile Competence Centre ; 650, Route Des Lucioles ; F-06921 Sophia-Antipolis Cedex ; France, vol. CT WG1, No. Zagreb, Croatia; Jun. 23, 2008, May 21, 2008, XP050029410, Chapter 7.3.3.2.1; p. 56 Chapters 9.4.1-9.4.3; pp. 69-70 Chapter 10.4; p. 85 Chapters 10.14.1.1.2-10.14.1.1.3; p. 93.
Ericsson: "PDN GW identification" 3GPP Draft; S2-083275_23. 402_CR0263_PDN_GW Identity_PA2, 3rd Generation Partnership Project (3GPP), Mobile Competence Centre ; 650, Route Des Lucioles ; F-06921 Sophia-Antipolis Cedex ; France, vol. SA WG2, No. Prague; May 12, 2008, Apr.30, 2008, XP050265506 Chapters 8.3 and 9.5; pp. 24-29.
Jun Wang, "Access Authentication and Authorization in UMB", May 14, 2007, 3rd Generation Partnership Project 2 "3GPP2", pp. 1-3.
Technical Specification Group Services and System Aspects: "Architecture enhancements for non-3GPP accesses TS 23.402 V8.0.0 (Release 8)" 3GPP-Standards, 2500 Wilson Boulevard,Suite 300, Arlington, Virginia 22201 USA, Dec. 2007, XP040278698 Chapter 4.1.2; p. 12 Chapters 4.3.2-4.3.5.2; pp. 22-24 Chapters 6.2.1-6.3; pp. 54-62 Chapters 8-9.3.2; pp. 82-104 Annex C.5; pp. 124-125.
Taiwan Search Report—TW097109263—TIPO—Nov. 15, 2011.

* cited by examiner

METHOD AND APPARATUS FOR HANDOFF BETWEEN ACCESS SYSTEMS

CLAIM OF PRIORITY UNDER 35 U.S.C. §119

The present Application for patent claims priority to Provisional Application No. 60/895,365 entitled "INTERTECHNOLOGIES INTERWORKING" filed on Mar. 16, 2007, and assigned to the assignee hereof and hereby expressly incorporated by reference herein.

BACKGROUND

1. Field

The following description relates generally to wireless communications, and more particularly to methods and apparatus for session handoff procedures between a source access system and a target access system.

2. Background

Wireless networking systems have become a prevalent means to communicate with others worldwide. Wireless communication devices, such as cellular telephones, personal digital assistants, and the like have become smaller and more powerful in order to meet consumer needs and to improve portability and convenience. Consumers have become dependent upon these devices, demanding reliable service, expanded areas of coverage, additional services (e.g., web browsing capabilities), and continued reduction in size and cost of such devices.

In particular, as the evolution of wireless technologies continues to advance, the progression of mobile services will continue to evolve into ever-richer, more compelling mobile and converged services. With end users demanding more and higher-quality multimedia content in all environments, the evolution of device technologies will continue to enhance the increasing consumption of data usage. For example, over the last several years, wireless communications technologies have evolved from analog-driven systems to digital systems. Typically in conventional analog systems, the analog signals are relayed on a forward link and a reverse link and require a significant amount of bandwidth to enable signals to be transmitted and received while being associated with suitable quality. As the analog signals are continuous in time and space, no status messages (e.g., messages indicating receipt or non-receipt of data) are generated. In contrast, packet-switched systems allow analog signals to be converted to data packets and transmitted by way of a physical channel between an access terminal (AT) and a base station, router, and the like. In addition, digital data can be relayed in its natural form (e.g., text, Internet data, and the like) via employing a packet switched network.

As such, digital wireless communication systems are widely deployed to provide various communication services such as telephony, video, data, messaging, broadcasts, and the like. Such systems commonly employ an access network that connects multiple access terminals to a wide area network (WAN) by sharing the available network resources. The access network is typically implemented with multiple access points dispersed throughout a geographic coverage region. Moreover, the geographic coverage region can be divided into cells with an access point in each cell. Likewise, the cell can be further divided into sectors. However, in such system architecture, supplying an efficient handoff between access systems that do not share the same communication procedures and policies becomes a challenging task.

SUMMARY

The following presents a simplified summary in order to provide a basic understanding of the described aspects. This summary is not an extensive overview and is intended to neither identify key or critical elements nor delineate the scope of such aspects. Its purpose is to present some concepts of the described aspects in a simplified form as a prelude to the more detailed description that is presented later.

The described aspects enable handover pre-setup and execution and re-routing of data packets between networks (e.g., heterogeneous networks), via employing an inter-system handoff control component. Such inter-system handoff control component can facilitate session handoff from a source access system to a target access system during various stages of handover preparation and handover execution by implementing a packet tunneling from the AT—through the source access system—and to the target access system. The AT can operate in dual mode stacks, and yet over-the-air can transmit data over one technology, for example. Accordingly, the AT utilizes a pre-setup over the tunnel, to minimize a need to complete such procedure at the handoff time.

As such, the inter-system handoff control component can supply tunneling in advance, as part of session negotiation between the AT and the target access system—wherein packets are transported (e.g., either transparently or non-transparently) via the source access system (e.g., to reduce interruption during handoff and mitigate a requirement to perform session setup during handoff.) It is to be appreciated that during session negotiation between the AT and the target access system, the source access system is typically not engaged, as it is considered a system different therefrom (e.g., a heterogeneous system that employs a different technology and/or communication procedures and protocols.) Moreover, packets that are tunneled can be specific to pre-setup of handover and handover execution in the target system, and such tunneled packets may be transported over IP or over the link layer. For example, such packets can relate to signaling messages associated with the target access system, messages specific to the target RAN, signaling related to preset up of IP addresses in the target access system, related authentication and authorizations, and the like.

In a related aspect, during the handoff preparation stage, tunnel(s) can be established from the AT to the source access system, wherein from the AT's point of view, the inter-system communication occurs between the two access systems, and the signaling of the "mobile-target access system" proceeds over such tunnel. Such tunneling can further be accompanied by establishing other tunnels to the target access system depending on type of tunneling involved (e.g., whether tunneling occurs at data link layer). The source access system can further designate the target access system based on pilot report, wherein the AT can then communicate with the target access system and establish a process for negotiation.

According to a methodology, initially the AT (e.g., mobile device) communicates with the source access system and its procedures/technology. A hand over preparation stage is then initiated upon triggering of a predetermined event(s), wherein the source access system can be notified of a request to handoff a session to a target access system (that employs a set of procedures/technology different from the source access system.) The notification can be triggered based on weakening of a pilot signal, and/or advertisement from the target access system to indicate that the AT is reaching an edge of coverage for the source system, and that preparation for handoff may be initiated. Such handover preparation stage can further include pre-setting a Radio Access Network (RAN) associated with the target system.

Subsequently, a target connection preparation stage occurs, which can be based on a trigger at the source access system or at the target access system, such as a predetermined event related to the pilot signal information. Accordingly, the AT can request over-the-air resources, and further include assignment of radio resources from the target access system to the AT. Once the AT receives the resulting assignment in the tunnel, the AT can then acquire the target access system and divert packets thereto. As such, during a handover execution or completion, AT acquires the target access system over-the-air and IP traffic is re-directed to the AT, wherein packets can be transported (either transparently or non-transparently) via the source access system. Exemplary hand off between such heterogeneous access systems can include a handoff between: Ultra Mobile Broadband (UMB) and High Rate Packet Data (HRPD); WiMax/HRPD; Long Term Evolution (LTE)/HRPD, wherein system architectures can implement Internet Protocol (IP) mobility using client mobile IP to actively involve the mobile for handoff preparation.

To the accomplishment of the foregoing and related ends, certain illustrative aspects are described herein in connection with the following description and the annexed drawings. These aspects are indicative, however, of but a few of the various ways in which the principles of the disclosed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
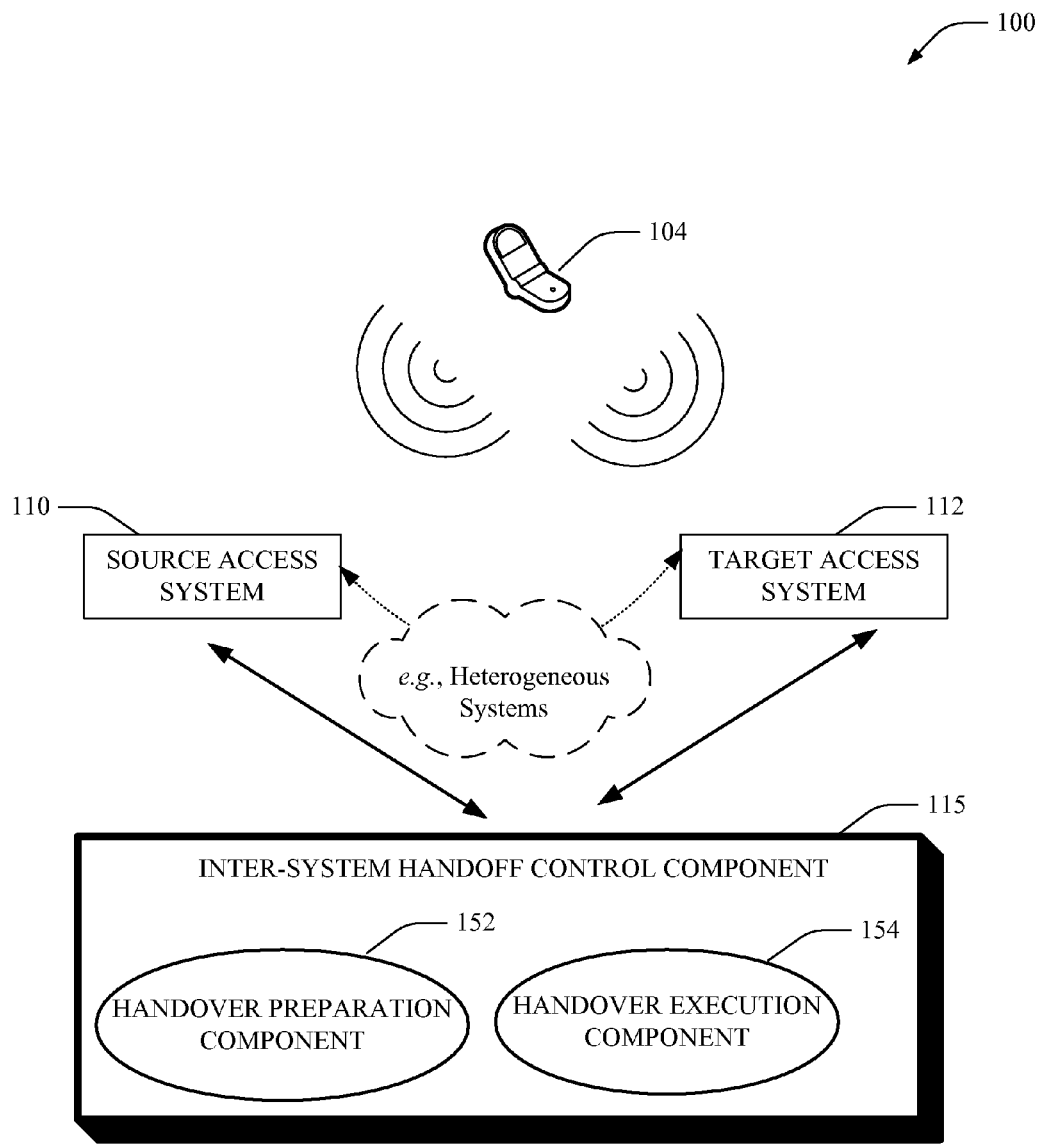
FIG. 1 illustrates an exemplary inter-system handoff control component that enables a session handoff from a source access system to a target access system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2).

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates a network system 100 that enables handover pre-setup/execution and re-routing of data packets between networks (e.g., heterogeneous networks), and the inter-working between a source access system 110 and a target access system 112. The system 100 enables pre-establishing tunnels to the target access system 112 as part of a session handoff between heterogeneous access systems, namely; the source access system 110 and the target access system 112. The inter-system handoff control component 115 can facilitate such session handoff during various stages, via employing a handover preparation component 152 and a handover execution component 154. Accordingly, tunneling can be implemented from the AT 104 that operates in dual mode to accommodate both the source access system 110 and the target access system 112—even though that such AT may be able to transmit only in one access system at any given instance, for example. Exemplary hand off between such heterogeneous access systems can include a handoff between: Ultra Mobile Broadband (UMB) and High Rate Packet Data (HRPD); WiMax/HRPD; Long Term Evolution (LTE)/HRPD, wherein system architectures can implement Internet Protocol (IP) mobility using client mobile IP or proxy mobile IP to actively involve the mobile for handoff preparation.

As such, the inter-system handoff control component 115 can utilize tunneling in advance of a handoff to exchange handover set-up and execution packets as part of session negotiation between the AT 104 and the target access system 112, to reduce interruption during handoff and mitigate a requirement to perform session setup during handoff. The inter-system handoff control component 115 further enables communication data packets to be transported via the source access system 110, wherein such source access system 110 is typically not engaged during negotiations between the AT 104 and the target access system 112.

The AT 104 is initially in communication with the source access system 110, wherein the hand over preparation component 154 initiates a hand over preparation stage upon triggering of predetermined events. For example, the access source system 110 can be notified of a request to handoff a session to the target access system 112 that employs a set of procedures/technology that are different from the source access system 110. The notification can be triggered based on weakening of a pilot signal, and/or advertisement from the target access system 112, which indicates that the AT 104 is reaching an edge of coverage for the source access system 110, and that preparation for handoff may be initiated. Such handover preparation component 154 can further facilitate pre-setting parameters, etc. of a Radio Access network (RAN) associated with the target access system 112.

In a related aspect, the handover preparation component 152 can further supply connection preparation for the target access system 112, which can be initiated based on trigger at the source access system 110 or at the target access system 112, (e.g., initiated based on a predetermined event related to the pilot signal information.) The target preparation stage can further include request for over-the-air resources by the source access system 110, and assignment of radio resources from the target system to the AT. Likewise, the handover execution component 154 enables the AT 104 to acquire the target access system 112 over-the-air, wherein IP traffic is re-directed to the AT 104, and packets are transported (e.g., either transparently or non-transparently) via the source access system 110. In one aspect, the tunneling can also be concatenated (e.g., concatenated tunnels existing between AT and Source Core System, and between Source System and Target System).

Figure 2:
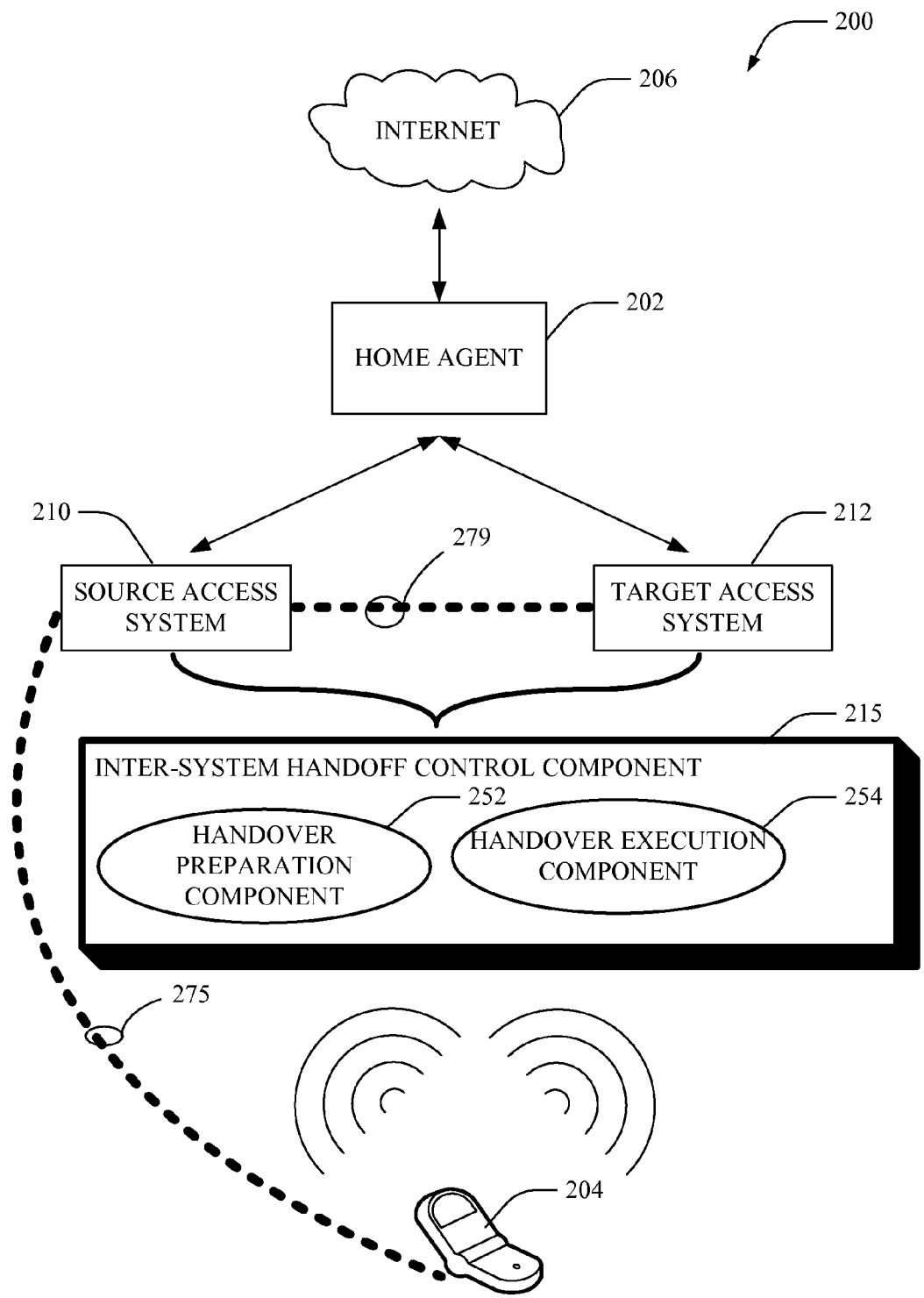
FIG. 2 illustrates a particular aspect, wherein the handover preparation component implements tunneling from the AT to the target access system.

FIG. 2 illustrates a particular aspect, wherein the handover preparation component 252 implements a tunnel 275 from AT 204 to the source access system 210, in conjunction with another tunnel 279 from the source access system 210 to the target access system 212. Such tunnels 275, 279 can represent logical associations between the AT 204, the source access system 210 and the target access system 212 (e.g., IP, L2 (data link layer), signaling, and the like). As illustrated in FIG. 2, the AT 204 can detect a change in signal strength that initiates a session handoff from the source access system 210 to the target access system 212. For example, initially a handover preparation component 252 establishes tunnel 275 between the source access system 210 and the AT 204. As such, the source access system 210 becomes aware that the AT 204 requests a session handoff to a target access system 212, wherein the source access system 210 subsequently designates the target access system 212 based on a pilot report, for example. The handover preparation component 252 then facilitates establishing another tunnel 279 between the source access system 210 and the target access system 212. Such tunnel 279 can be established via a mapping determined in part through the pilot reported by the AT 204 without the AT 204 having such knowledge, for example.

The system 200 can further include a home agent 202, which can be a router on a home network of an access terminal that maintains information regarding the routing of packets received from the Internet 206 to the access terminal 204 during packet transfer between the source access system 210, and the target access system 212. For example, home agent 202 can also employ tunneling mechanisms to forward data from the Internet 206, thereby not requiring an IP address of access terminal 204 to alter each time access terminal 204 connects to the home network from a different location.

Furthermore, in one aspect, the source access system 210 can provide an indication to the target access system 212 and/or the inter-system handoff control component 215 that the source access system 210 is no longer serving access terminal 204 and that target access system 212 is serving access terminal 204. Additionally, the source access system 210 can indicate an identity of a most recently received data packet, thereby providing the target access system 212 with a data packet that is next in a sequence.

In another example, the source access system 210 can indicate which data packets the source access system 210 has already forwarded to the target access system 212. For example, source access system 210 can interact to ensure that duplicative data is not delivered to target access system 212. Target access system 212 can receive data for transmission from source access system 210 and can additionally receive indications of a sequence of transmission such that a seamless handoff occurs and data is transmitted to access terminal 204 in an appropriate order.

It is to be appreciated that various permutations can be contemplated and are intended to fall under the scope of the hereto-appended claims. For instance, the source access system 210 can receive an indication that access terminal 204 is requesting handoff to target access system 212 prior to target access system 212 receiving such indication. Moreover, the source access system 210 can accordingly indicate the handoff to target access system 212 and provide for transmittal to access terminal 204.

Figure 3:
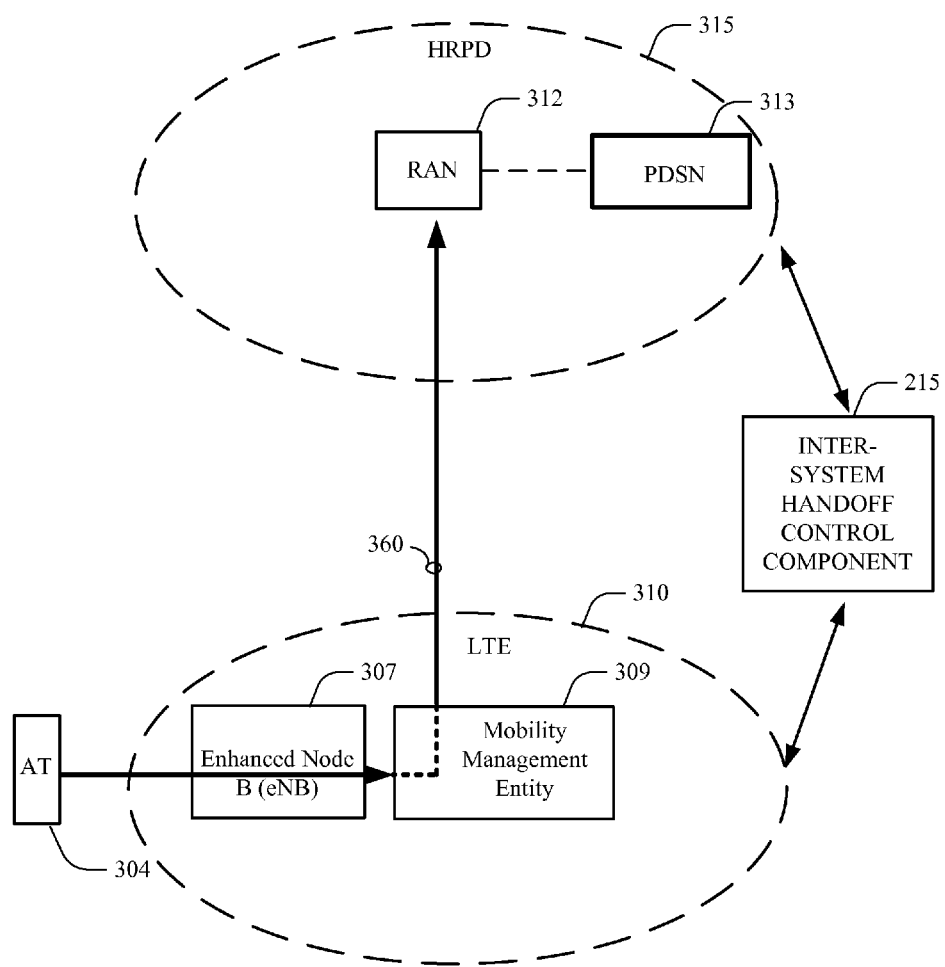
FIG. 3 illustrates re-routing of packets to enable handover pre-setup/execution between heterogeneous networks.

FIG. 3 illustrates a handover pre-setup/execution and re-routing of data packets between heterogeneous networks, namely; a source access system represented by the LTE system 310 (including Radio Access Network (RAN) 312 in communication with Packet Data Switch Network (PDSN) 313) and an HRPD system 315 (including Enhanced Node B (eNB) 307 in communication with Mobility Management Entity 309), which represents the target access system. As the AT 304 moves to another geographic location, session handoff can be initiated based on a pilot report. Alternatively, trigger for handoff preparation can be due to advertisement of the target access system 315 as the neighboring technology to the source access system 310. Such tunneling 360 can be setup in advance, for example, during a handoff preparation phase to setup a target session. Accordingly, the system 300 facilitates session handoff from the source access system 310 to the target access system 315 during various stages of handover preparation and handover execution by implementing tunneling 360 from the AT 304, which operates in dual mode of the source system 310 and the target access system 315.

Figure 4:
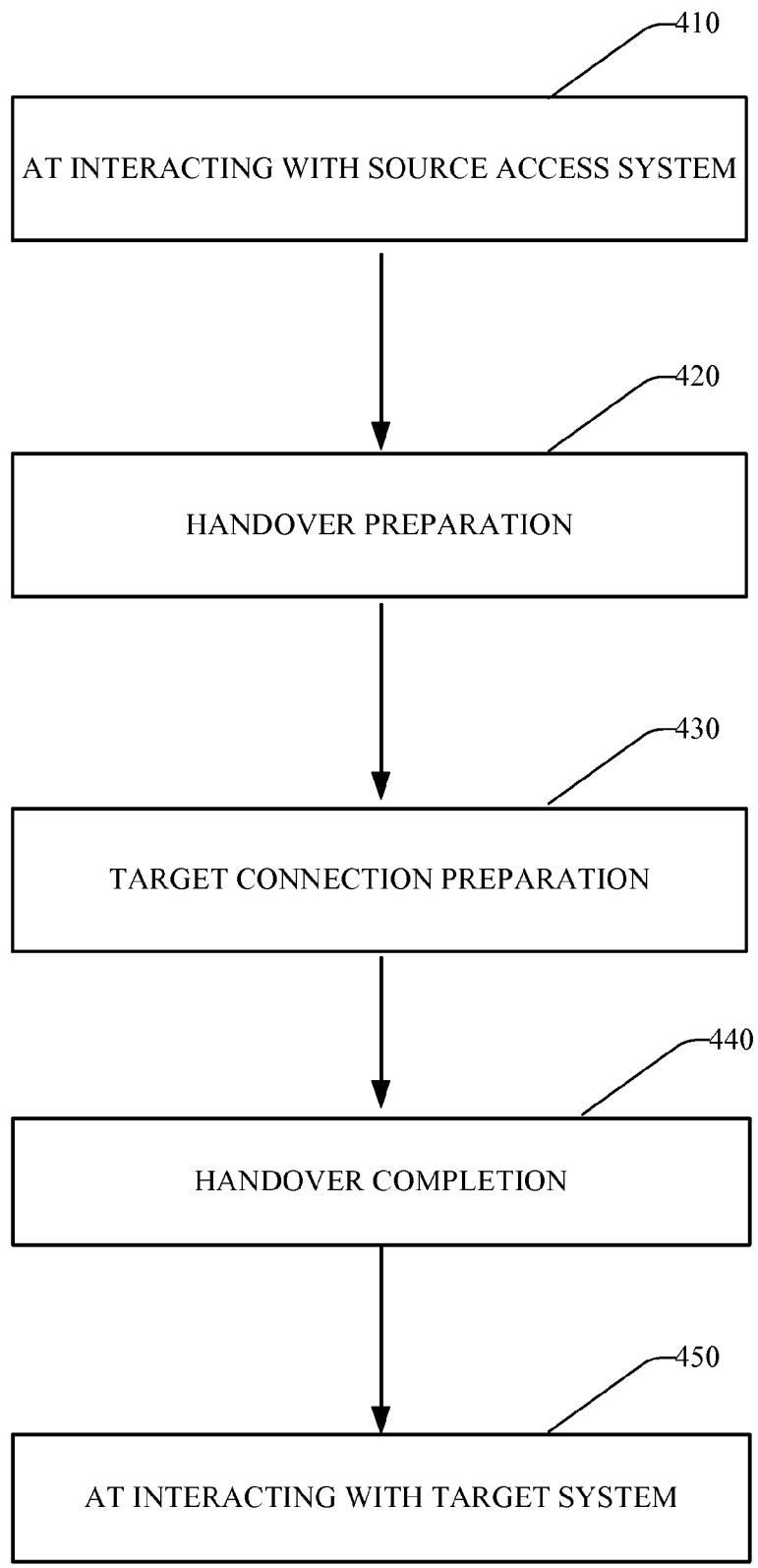
FIG. 4 illustrates a further methodology of re-routing packets for a handover pre-setup/execution between heterogeneous networks in accordance with an aspect.

FIG. 4 illustrates a methodology of handover pre-setup/execution and re-routing of data packets between heterogeneous networks, in accordance with an aspect. While the exemplary method is illustrated and described herein as a series of blocks representative of various events and/or acts, the subject aspect is not limited by the illustrated ordering of such blocks. For instance, some acts or events may occur in different orders and/or concurrently with other acts or events, apart from the ordering illustrated herein, in accordance with the described aspects. In addition, not all illustrated blocks, events or acts, may be required to implement a methodology in accordance with the subject aspects. Moreover, it will be appreciated that the exemplary method and other methods according to the described aspects may be implemented in association with the method illustrated and described herein, as well as in association with other systems and apparatus not illustrated or described.

Initially and at 410, AT is interacting with a source access system and employs its procedures/technology. Subsequently, at 420, a hand over preparation stage is initiated that supplies tunneling in advance between the AT and the source and/or target access system, to enable packet transport via the source access system and to pre-setup session configurations in the target access system.

Next and at 430, a target connection preparation stage occurs, which can be based on a trigger at the source access system or at the target access system, such as occurrence of a predetermined event related to the pilot signal information. Accordingly, the AT can request over-the-air resources, and can further acquire assignment of radio resources from the target system. At 440, during a handover completion stage the AT acquires the target system over-the-air, wherein the AT then starts communicating directly with the target system at 450.

Figure 5:
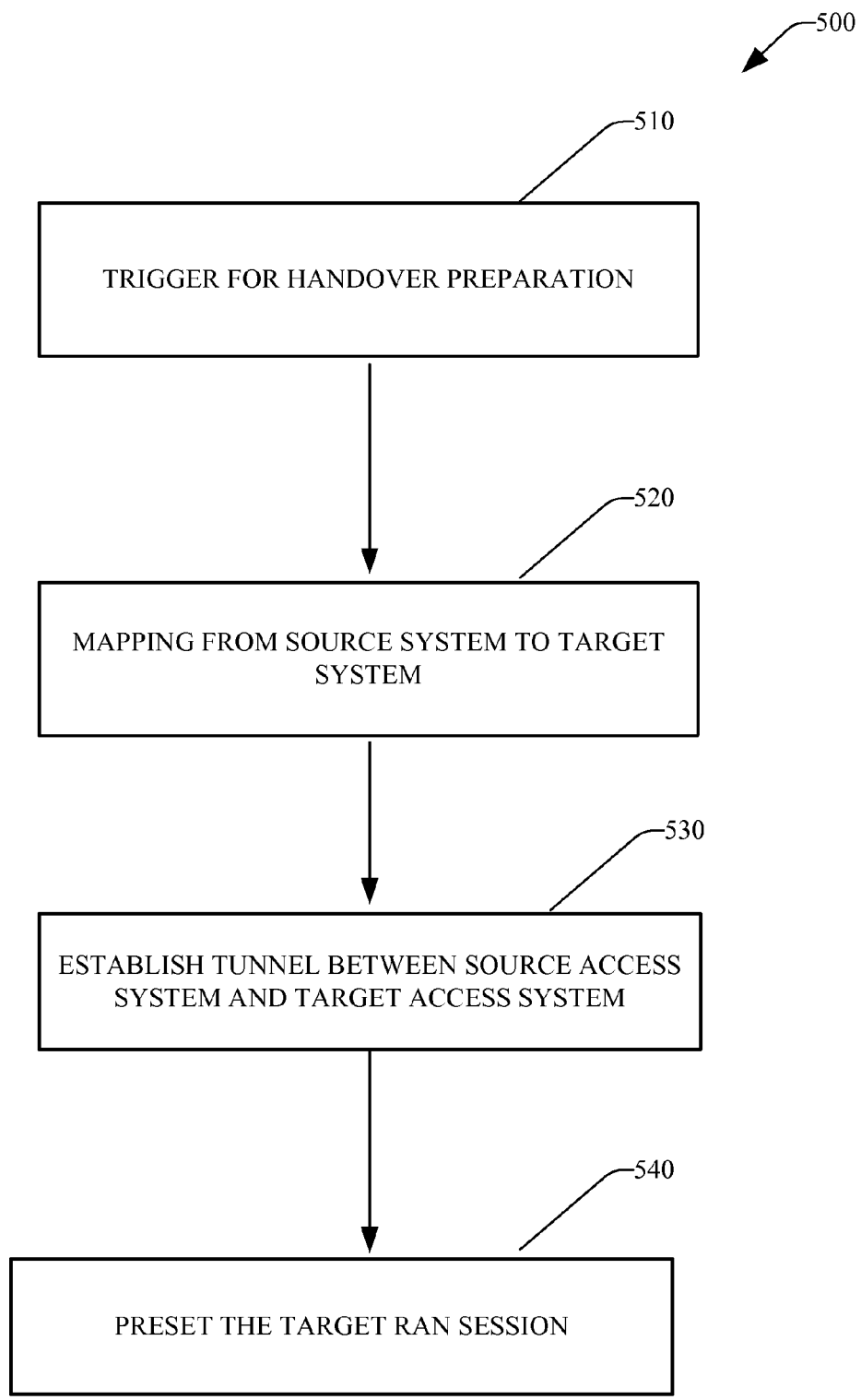
FIG. 5 illustrates a related methodology of session handoff according to a further aspect.

FIG. 5 illustrates a related methodology 500 for session handoff according to a further aspect of the handover preparation stage. Initially, at 510, the source access system can be notified of a request to handoff a session to a target access system, triggered based upon the occurrence of one or more predetermined events. For example, the notification can be triggered based on weakening of a pilot signal, and/or advertisement from the target access system, which may indicate that the AT is reaching an edge of coverage for the source system, and/or that preparation for handoff may be desirable. A mapping can then be performed between current pilot and other pilot(s) being recorded to designate the target access system, at 520. Next, at 530, a tunnel can be established between the source access system and the target access system, wherein parameters of the Radio Access Network (RAN) of the target system can be preset, at 540 (e.g., tunneling at a data link layer—L2 tunneling).

Figure 6:
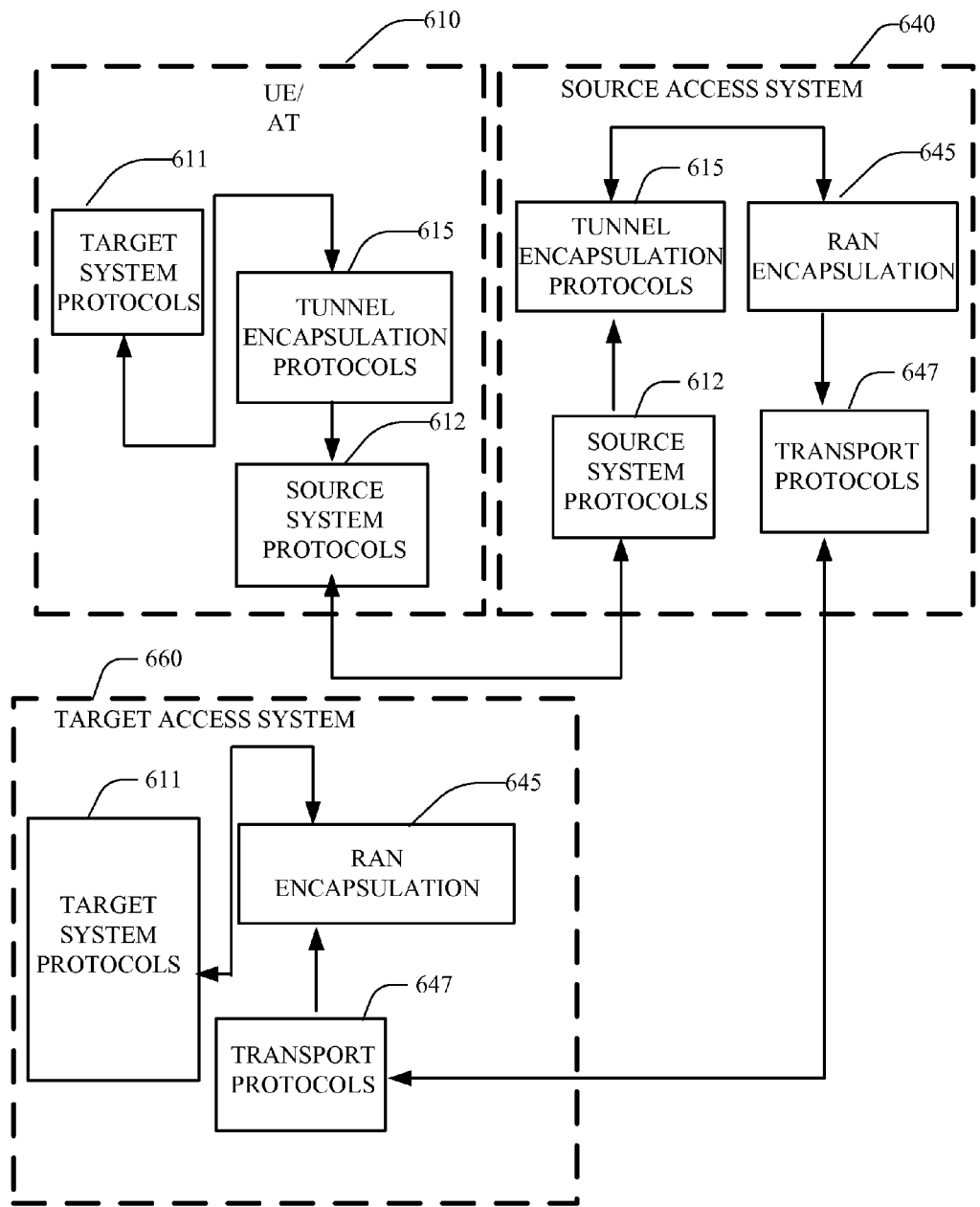
FIG. 6 illustrates an exemplary block diagram for an interaction between the source access system and the target access system.

FIG. 6 illustrates an exemplary block diagram for an interaction among User Equipment or access terminal 610, the source access system 640 and the target access system 660. The UE 610 includes both the target system protocol 611 and the source system protocol 612, to enable dual mode operation with both systems. In one aspect, the source access system 640 does not participate in a session that is negotiated between the AT 610 and the target access system 660 (e.g., due to difference in technology). Likewise, the tunnel encapsulation protocols 615 can supply tunneling in advance of the handover as part of the session negotiation between the AT 610 and the target access system 660 (e.g., to reduce interruption during handoff and mitigate a requirement to perform session setup during the handoff), while data packets are transported (e.g., either transparently or non-transparently) via the source access system 640

The arrangement 600 facilitates session handoff from the source access system 640 to the target access system 660, utilizing handover preparation and handover execution prior to the handover, by implementing tunneling encapsulation protocol 615 from the AT 610. Likewise, the RAN encapsulation component 645 facilitates handover preparation and pre-setting parameters for UE 610 to communicate via transport protocol 647 with a Radio Access Network (RAN) associated with the target access system 660.

Figure 7:
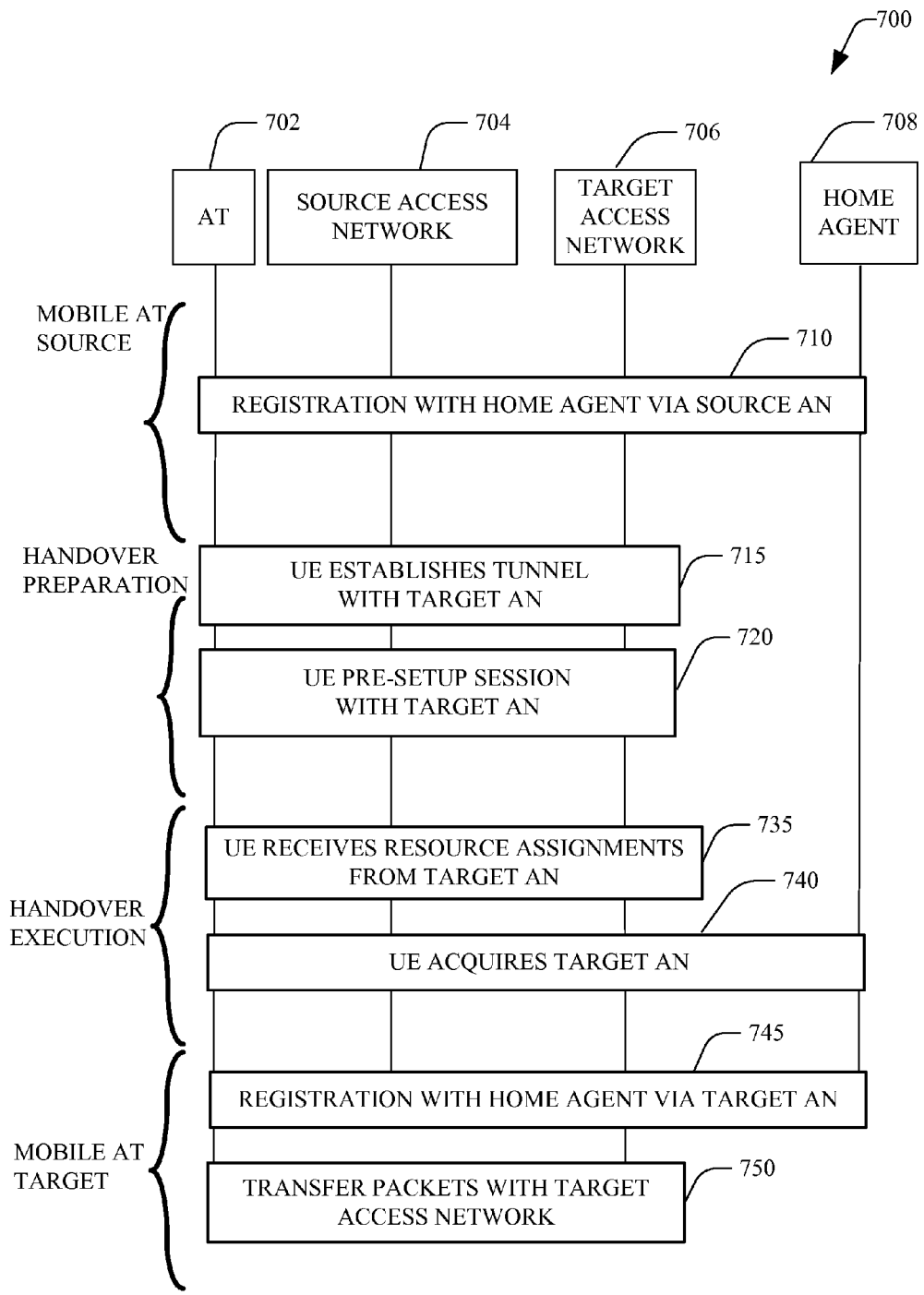
FIG. 7 illustrates an exemplary call flow that enables re-routing of packets for a handover pre-setup/execution and re-routing of data packets in heterogeneous networks.

FIG. 7 illustrates an exemplary call flow 700 for re-routing of data packets in heterogeneous networks 704, 706. Initially, at 710, AT or UE 702 is at the source network 704, wherein the AT 702 or UE registers with home agent 708. At 715 and 720, during handover preparation, the UE establish a tunnel with a target access network (target AN) 706 and engages in a pre-set up of a session with the target AN 706. Subsequently, at 735 and 740, and during a handover execution stage, the UE receives resource assignment from the target AN 706 and acquires target AN 706. Next, the UE can directly communicate with such target AN 706, and, at 745, can also register with the home agent via the target AN 706. Packets can further be transferred with the target access network, at 750.

Figure 8:
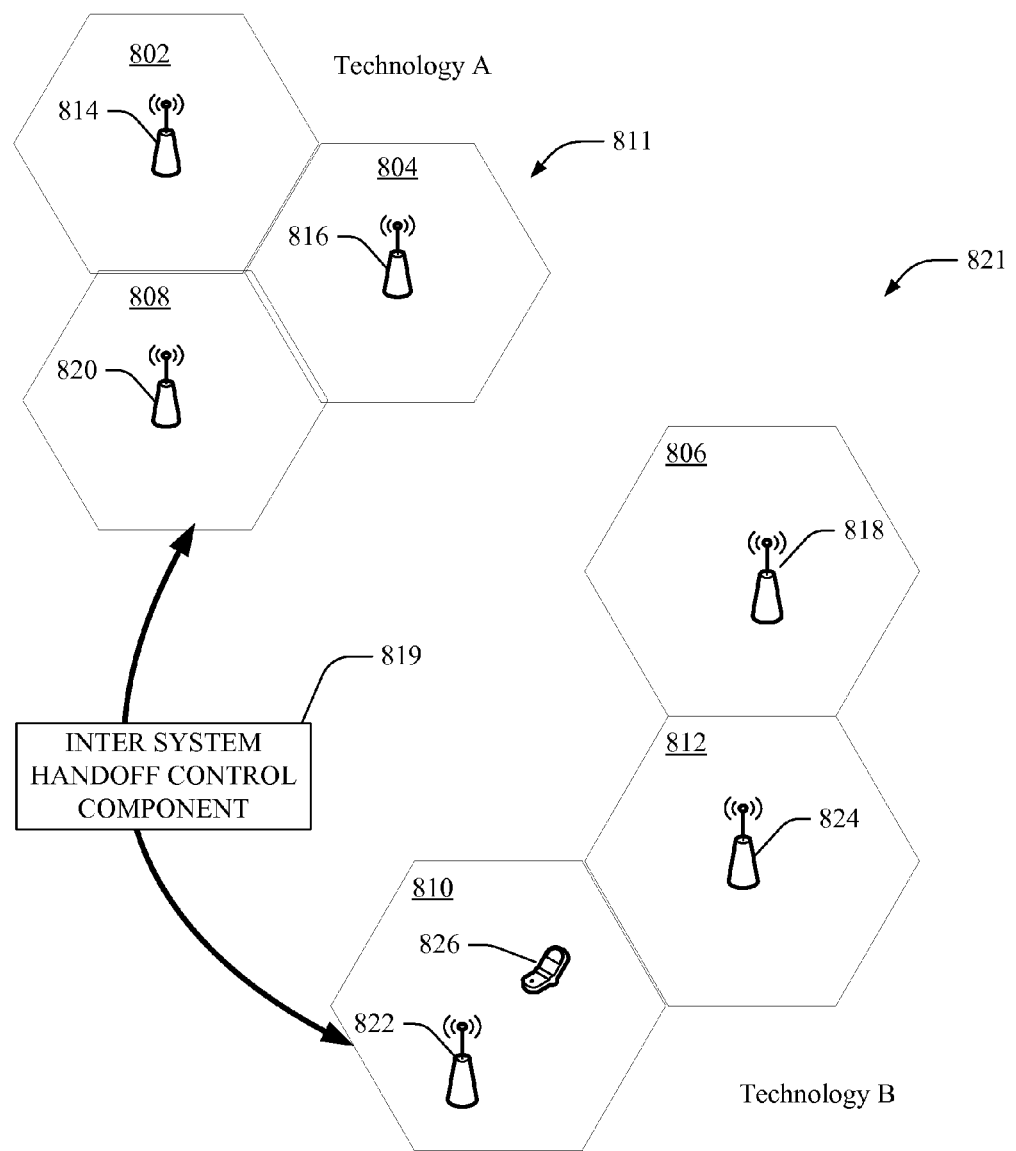
FIG. 8 illustrates exemplary heterogeneous wireless communications systems according to a related aspect.

FIG. 8 illustrates exemplary heterogeneous wireless communications systems 811, 821 that can supply service to a wireless terminal 826. The systems 811, 821, represent a target access system and a source access system respectively, which include a plurality of sectors 802, 804, 808, and 806 810, 812. The target access system 811 and the source access system 821 can employ different wireless services within such sectors. While such sectors are shown as being hexagonal in nature and of substantially similar size, it is understood that size and shape of these sectors can vary depending upon geographical region, number, size, and shape of physical impediments, such as buildings, and several other factors.

Access points (base stations, access routers, etc.) 814, 816, 820 are associated with sectors 802, 804, 808, wherein technology "A" is employed as part thereof. Similarly, access points 818, 822, 824 are associated with sectors 806, 812, 810, wherein technology "B" is employed as part thereof, wherein technology "B" is different from technology "A."

As wireless terminal 826 is geographically ported, it may receive signals with greater strength from target access system 811 when compared to signals received from source access system 821. It is to be appreciated that the wireless terminal 826 can operate in dual mode with both the source access system 821 and the target access system 811—wherein the inter-system handoff control component 819 can supply tunneling in advance of the handoff as part of session negotiation between the AT 826 and the target access system 811. Accordingly, data packets can be transported (either transparently or non-transparently)) via the source access system 821 while the AT is preparing for handoff to the target system, and then the data packets can be redirected to the target system once the handoff is completed.

Figure 9:
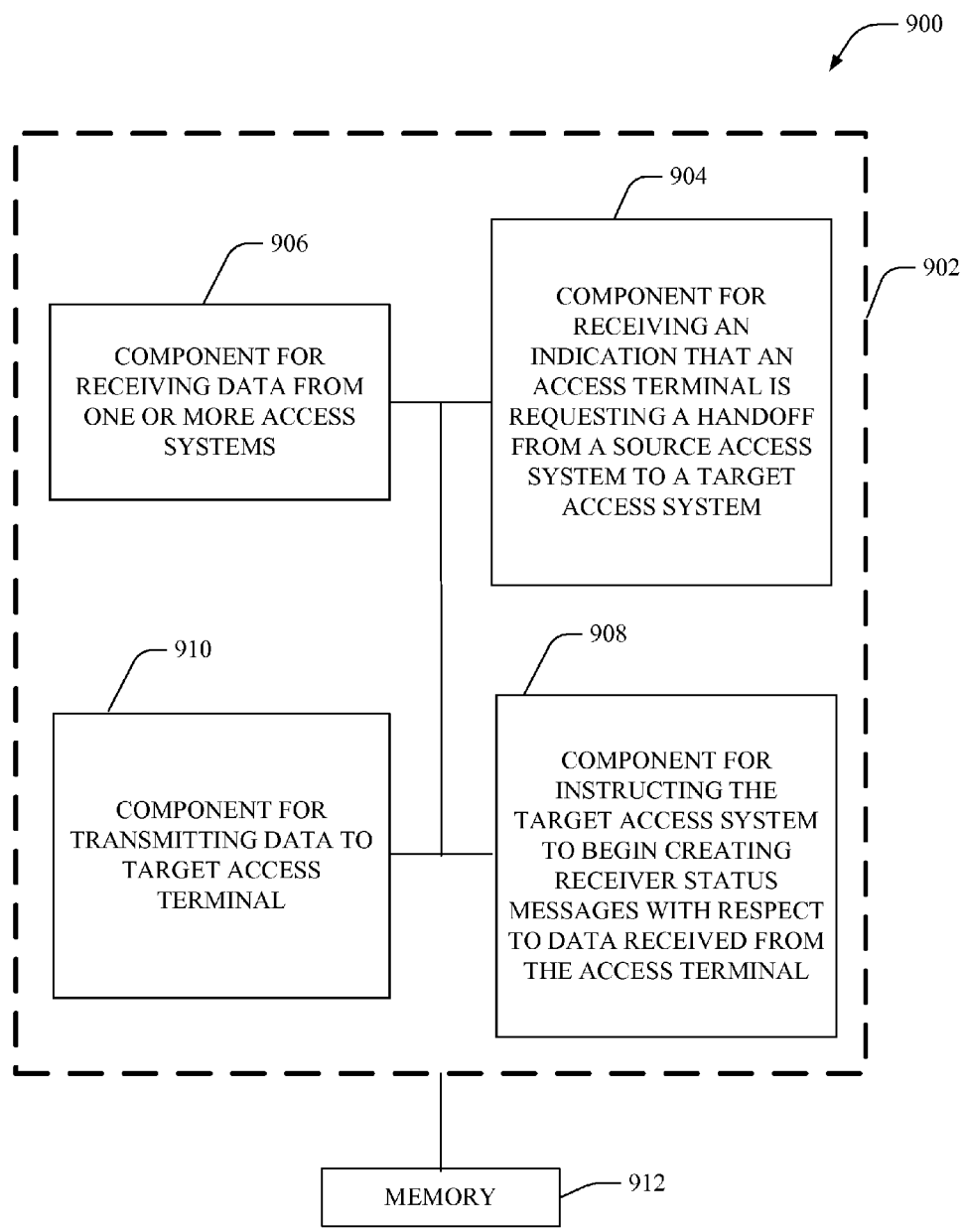
FIG. 9 illustrates a particular system that facilitates transmittal of data between heterogeneous access systems when a handoff is requested via an L2 (data link layer) tunneling established by the mobile unit.

FIG. 9 illustrates a particular system 900 that facilitates transmittal of data between heterogeneous access systems, when a handoff is requested, via a tunneling established by the mobile unit and the target access system via the source access system. The system 900 can be associated with an access point and includes a grouping 902 of components that can communicate with one another in connection with transmitting communication data packets to an access terminal during a handoff between heterogeneous access systems. Grouping 902 includes a component 904 for determining that an access terminal has requested a handoff from a first access system to a second access system. For example, such determination can occur by analyzing an identity of a target access system by the source access system. Such identity determination can further implement mapping scenarios to designate the target access system.

Grouping 902 also includes a component 906 for receiving communication data from the first access system, as well as receiving an indication of what communication data should next be transmitted to the access terminal from such first access system. For example, a timestamp or other sequence number in an RLP packet header can indicate what communication data should be next transmitted to the access terminal. Grouping 902 additionally includes a component 908 for receiving communication data from a network module, wherein the data is desirably transmitted to the access terminal. Moreover, the communication data received from the network module can be an IP-encapsulated data packet that is associated with a sequence number or stamp, thereby enabling the access systems to determine what communication data to next transmit to the access terminal. Grouping 902 can further include a component 910 for transmitting communication data to the access terminal in an appropriate sequence, wherein the communication data is received from the first access system and the network module. For example, the second access system can receive communication data to be transmitted to the access terminal, wherein the communication data is not duplicative of communication data already transmitted by the first access system, and wherein the communication data is to be transmitted in a particular sequence. System 900 can also include a memory 912, which can retain instructions relating to executing components 904-910. The system 900 enables the new or target access system to start receiving communication data in preparation of handoff even though the source has not relinquished control yet, wherein the received communication data may be buffered at the target access system.

Figure 10:
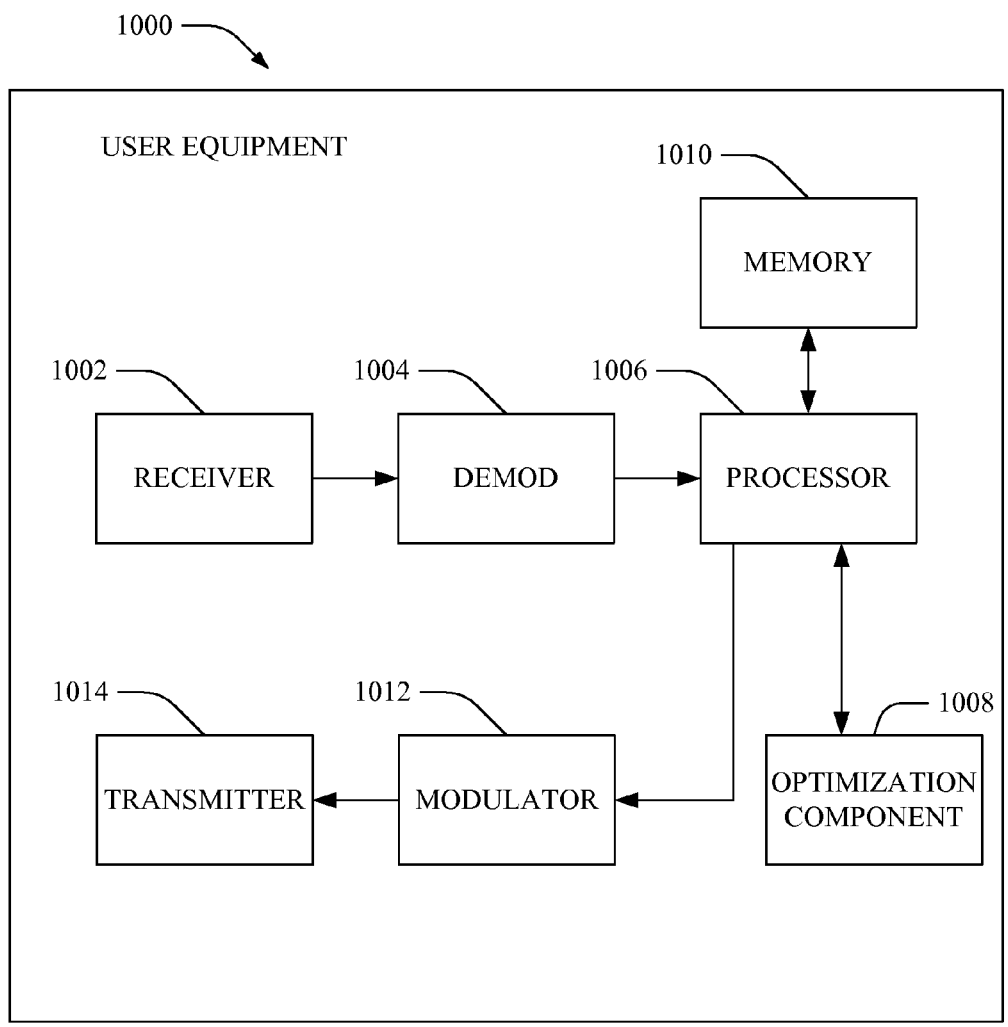
FIG. 10 illustrates a system that can be employed in connection with transmitting data to an access terminal before and after a handoff in L2 layer.

FIG. 10 illustrates a system 1000 that can be employed in connection with transmitting data to an access terminal before and after a handoff in L2 layer. System 1000 comprises a receiver 1002 that receives a signal from, for instance, one or more receive antennas, and performs typical actions thereon (e.g., filters, amplifies, downconverts, . . . ) the received signal and digitizes the conditioned signal to obtain samples. A demodulator 1004 can demodulate and provide received pilot symbols to a processor 1006 for channel estimation.

Processor 1006 can be a processor dedicated to analyzing information received by receiver component 1002 and/or generating information for transmission by a transmitter 1014. Processor 1006 can be a processor that controls one or more portions of system 1000, and/or a processor that analyzes information received by receiver 1002, generates information for transmission by a transmitter 1014, and controls one or more portions of system 1000. System 1000 can include an optimization component 1008 that can optimize performance of user equipment before, during, and/or after handoff. Optimization component 1008 may be incorporated into the processor 1006. It is to be appreciated that optimization component 1008 can include optimization code that performs utility based analysis in connection with determining whether to handoff from a source access system to a target access system. The optimization code can utilize artificial intelligence based methods in connection with performing inference and/or probabilistic determinations and/or statistical-based determination in connection with performing handoffs.

System (user equipment) 1000 can additionally comprise memory 1010 that is operatively coupled to processor 1006 and that stores information such as signal strength information with respect to a base station, scheduling information, and the like, wherein such information can be employed in connection with determining whether and when to request a handoff. Memory 1010 can additionally store protocols associated with generating lookup tables, etc., such that system 1000 can employ stored protocols and/or algorithms to increase system capacity. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1010 is intended to comprise, without being limited to, these and any other suitable types of memory. Processor 1006 is connected to a symbol modulator 1012 and transmitter 1014 that transmits the modulated signal.

Figure 11:
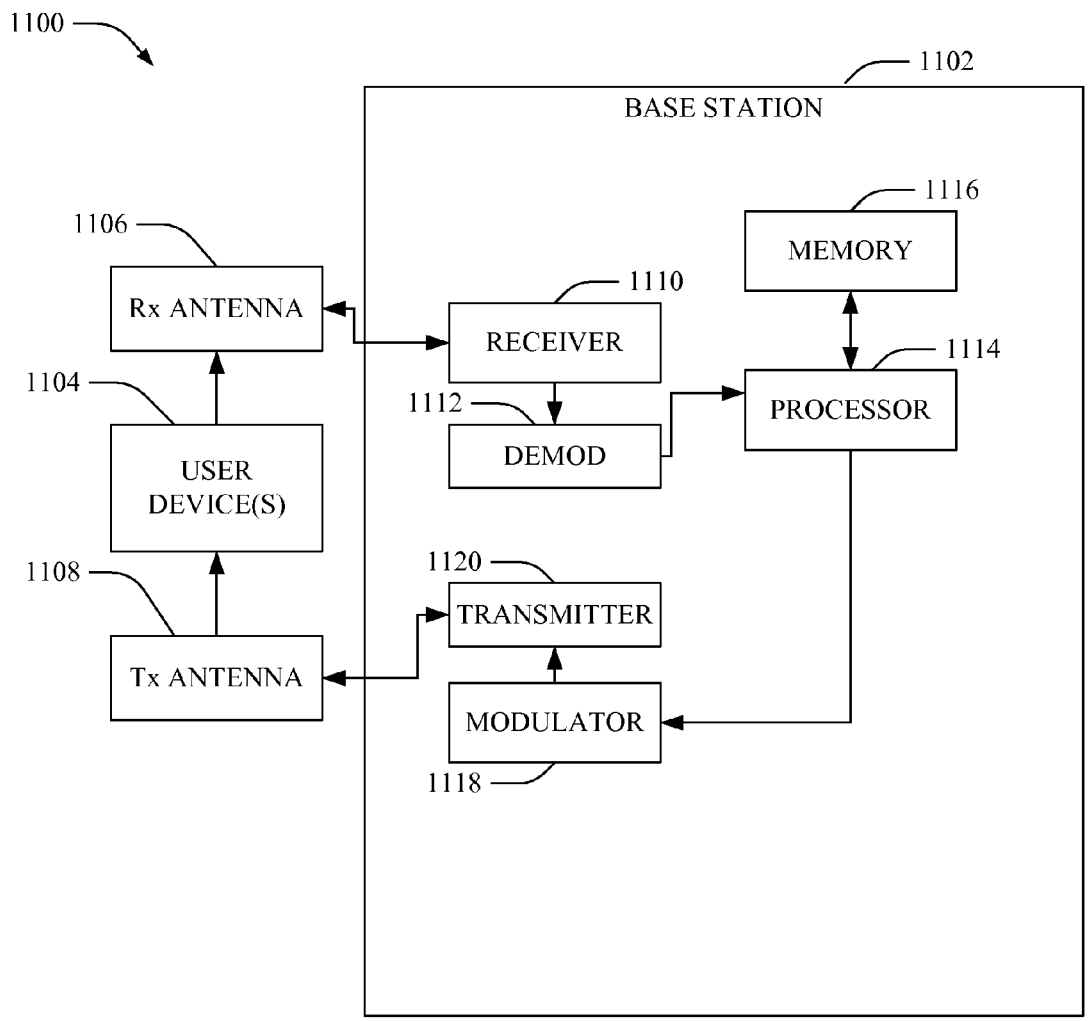
FIG. 11 illustrates a system that can be employed in connection with receiving an indication of handoff and/or transmitting data to an access terminal accordingly.

FIG. 11 illustrates a system that can be employed in connection with receiving an indication of handoff and/or transmitting data to an access terminal accordingly. System 1100 comprises a base station 1102 with a receiver 1110 that receives signal(s) from one or more user devices 1104 by way of one or more receive antennas 1106, and transmits to the one or more user devices 1104 through a plurality of transmit antennas 1108. In one example, receive antennas 1106 and transmit antennas 1108 can be implemented using a single set of antennas. Receiver 1110 can receive information from receive antennas 1106 and is operatively associated with a demodulator 1112 that demodulates received information. Receiver 1110 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. For instance, multiple receivers can be employed (e.g., one per receive antenna), and such receivers can communicate with each other to provide improved estimates of user data. Demodulated symbols are analyzed by a processor 1114 that is similar to the processor described above with regard to FIG. 9, and is coupled to a memory 1116 that stores information related to user device assignments, lookup tables related thereto and the like. Receiver output for each antenna can be jointly processed by receiver 1110 and/or processor 1114. A modulator 1118 can multiplex the signal for transmission by a transmitter 1120 through transmit antennas 1108 to user devices 1104.

As used in this application, the term AT refers to an end node accessing the two access systems, wherein the end node can be: an end user device, a mobile device, a device operating according to 3GPP2 specification, a device operating according to 3GPP specification, a device operating according to IEEE specifications or/and User Equipment.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method of session handoff in wireless communications, comprising:

initiating a handover preparation stage between an access terminal (AT) and a target access system, upon triggering of a predetermined event, wherein the predetermined event at least comprises receiving advertising from the target access system indicating that the AT is reaching an edge of coverage of a source access system;

tunneling between the source access system and the target access system; and transmitting handover-related signals received from the AT through the source access system to the target access system via the tunneling to facilitate the session handoff from the source access system to the target access system, wherein the transmitting comprises negotiating a session between the AT and the target access system to facilitate handover of a communication session of the AT from the source access system to the target access system, and the initiating and the transmitting are based at least in part on the received advertising.

2. The method of claim 1 further comprising establishing a tunnel from the AT to the source access system, wherein the source access system or the target access system is operable based on at least one of a 3GPP specification, a 3GPP2 specification, or an IEEE specification.

3. The method of claim 1, wherein transmitting handover-related signals further comprises presetting a Radio Access Network (RAN) parameter associated with the target access system.

4. The method of claim 1, further comprising requesting over-the-air resources from the target access system to initiate communication between the AT and the target access system.

5. The method of claim 1, further comprising registering the AT with the target access system to complete a session handoff.

6. The method of claim 1, wherein the tunneling is based on a mapping from the source access system to the target access system to facilitate handover preparation of the AT to the target access system.

7. At least one processor configured to supply session handoff comprising:
a first module, comprising hardware, for initiating a handover preparation stage between an access terminal (AT) and a target access system, upon triggering of a predetermined event, wherein the predetermined event at least comprises receiving advertising from the target access system indicating that the AT is reaching an edge of coverage of a source access system;
a second module for establishing a tunnel between the source access system and the target access system, wherein the source access system comprises a first technology different from a second technology of the target access system; and
a third module for transmitting handover-related packets received from the AT through the source access system to the target access system to facilitate the session handoff from the source access system to the target access system,
wherein the initiating and the transmitting are based at least in part on the received advertising, and the transmitting comprises negotiating a session between the AT and the target access system to facilitate handover of a communication session of the AT from the source access system to the target access system.

8. A computer program product comprising:
a non-transitory computer-readable medium comprising:
a first set of codes for causing a computer to initiate a handover preparation stage between an access terminal (AT) and a target access system, upon triggering of a predetermined event, wherein the predetermined event at least comprises receiving advertising from the target access system indicating that the AT is reaching an edge of coverage of a source access system;
a second set of codes for causing the computer to establish a tunnel between the source access system and the target access system that are heterogeneous; and
a third set of codes for causing the computer to transmit packets received from the AT through the source access system to the target access system via the tunnel to facilitate session handoff from the source access system to the target access system,
wherein the transmitting comprises negotiating a session between the AT and the target access system to facilitate handover of a communication session of the AT from the source access system to the target access system, and the initiating and the transmitting are based at least in part on the received advertising.

9. An apparatus comprising:
means for initiating a handover preparation stage between an access terminal (AT) and a target access system, upon triggering of a predetermined event, wherein the predetermined event at least comprises receiving advertising from the target access system indicating that the AT is reaching an edge of coverage of a source access system;
means for tunneling between the source access system and the target access system; and
means for sending packets received from the AT through the source access system to the target access system via the tunnel to facilitate session handoff from the source access system to the target access system,
wherein the means for sending comprises means for negotiating a session between the AT and the target access system to facilitate handover of a communication session of the AT from the source access system to the target access system, and the means for initiating and the means for sending are based at least in part on the received advertising.

10. A method of session handoff in wireless communications, comprising:
tunneling between a target access system and a source access system that implement different technologies;
advertising by the target access system to indicate that an access terminal (AT) is reaching an edge of coverage of the source access system;
negotiating a session between the AT and the target access system as part of a handover preparation; and
receiving packets by the target access system that are transmitted by the AT, wherein the packets are initially received by the source access system and re-routed through the source access system to the target access system via the tunnel to facilitate the session handoff from the source access system to the target access system.

11. The method of claim 10, the tunneling occurring without knowledge of the AT.

12. The method of claim 10, further comprising designating the target access system from pilot reports.

13. The method of claim 10, further comprising, prior to the tunneling, initiating a handover preparation stage upon triggering of a predetermined event, to facilitate communication of the AT with the target access system.

14. The method of claim 10, further comprising notifying the source access system of the session handoff as part of the handover preparation.

15. The method of claim 13, wherein the predetermined event comprises weakening of a pilot signal received by the source access system.

16. The method of claim 10, further comprising requesting over-the-air resource from the target access system during handover preparation.

17. The method of claim 10, further comprising registering the AT with the target access system, to complete handover execution.

18. The method of claim 10, further comprising mapping from the source access system to the target access system, to facilitate handover preparation between the source access system and the target access system.

19. The method of claim 10, wherein the tunneling is based on one of an intersystem signaling protocol, and a target system signaling.

20. The at least one processor of claim 7, wherein establishing a tunnel comprises establishing an L2 layer tunneling to the target access system.

21. The apparatus of claim 9, further comprising:
means for switching the access terminal from the source access system to the target access system.

22. The apparatus of claim 9, wherein the means for tunneling further comprises means for tunneling to the access terminal at a data link layer.

23. The apparatus of claim 9, further comprising means for identifying the target access system.

24. The apparatus of claim 9, further comprising means for preparing a session handover to the target access system.

25. At least one processor configured to supply session handoff in wireless communications, comprising:
- a first module, comprising hardware, for tunneling between a target access system and a source access system that implement different technologies;
- a second module for advertising by the target access system to indicate that an access terminal (AT) is reaching an edge of coverage of the source access system;
- a third module for negotiating a session between the AT and the target access system as part of a handover preparation; and
- a fourth module for receiving packets by the target access system that are transmitted by the AT, wherein the packets are initially received by the source access system and re-routed through the source access system to the target access system via the tunnel to facilitate the session handoff from the source access system to the target access system.

26. A computer program product, comprising:
a non-transitory computer-readable medium, comprising:
- a first set of codes for causing a computer to tunnel between a target access system and a source access system that implement different technologies;
- a second set of codes for causing the computer to advertise by the target access system to indicate that an access terminal (AT) is reaching an edge of coverage of the source access system;
- a third set of codes for causing the computer to negotiate a session between the AT and the target access system as part of a handover preparation; and
- a fourth set of codes for causing the computer to receive packets by the target access system that are transmitted by the AT, wherein the packets are initially received by the source access system and re-routed through the source access system to the target access system via the tunnel to facilitate the session handoff from the source access system to the target access system.

27. An apparatus, comprising:
- means for tunneling between a target access system and a source access system that implement different technologies;
- means for advertising by the target access system to indicate that an access terminal (AT) is reaching an edge of coverage of the source access system;
- means for negotiating a session between the AT and the target access system as part of a handover preparation; and
- means for receiving packets by the target access system that are transmitted by the AT, wherein the packets are initially received by the source access system and re-routed through the source access system to the target access system via the tunnel to facilitate the session handoff from the source access system to the target access system.

28. The apparatus of claim 27, further comprising, prior to the tunneling, means for initiating a handover preparation stage upon triggering of at least one event, to facilitate communication of the AT with the target access system.

29. The apparatus of claim 28, wherein the at least one event comprises weakening of a pilot signal received by the source access system.

30. The apparatus of claim 27, wherein the means for tunneling comprises means for establishing an L2 layer tunneling to the target access system.

31. A method of session handoff in wireless communications, comprising:
- tunneling between a source access system and a target access system;
- transmitting handover-related signals received from an access terminal (AT) through the source access system to the target access system via the tunneling to facilitate the session handoff from the source access system to the target access system, wherein the transmitting comprises negotiating a session between the AT and the target access system to facilitate handover of a communication session of the AT from the source access system to the target access system; and
- requesting over-the-air resources from the target access system to initiate communication between the AT and the target access system.

32. At least one processor configured to supply session handoff in wireless communications, comprising:
- a first module, comprising hardware, for tunneling between a source access system and a target access system;
- a second module for transmitting handover-related signals received from an access terminal (AT) through the source access system to the target access system via the tunneling to facilitate the session handoff from the source access system to the target access system, wherein the transmitting comprises negotiating a session between the AT and the target access system to facilitate handover of a communication session of the AT from the source access system to the target access system; and
- a third module for requesting over-the-air resources from the target access system to initiate communication between the AT and the target access system.

33. A computer program product comprising:
a non-transitory computer-readable medium comprising:
- a first set of codes for causing a computer to tunnel between a source access system and a target access system;
- a second set of codes for causing the computer to transmit handover-related signals received from an access terminal (AT) through the source access system to the target access system via the tunneling to facilitate the session handoff from the source access system to the target access system, wherein the transmitting comprises negotiating a session between the AT and the target access system to facilitate handover of a communication session of the AT from the source access system to the target access system; and
- a third set of codes for causing the computer to request over-the-air resources from the target access system to initiate communication between the AT and the target access system.

34. An apparatus comprising:
- means for tunneling between a source access system and a target access system;
- means for transmitting handover-related signals received from an access terminal (AT) through the source access system to the target access system via the tunneling to facilitate the session handoff from the source access system to the target access system, wherein the transmitting comprises negotiating a session between the AT and the target access system to facilitate handover of a communication session of the AT from the source access system to the target access system; and means for requesting over-the-air resources from the target access system to initiate communication between the AT and the target access system.

35. A method of session handoff in wireless communications, comprising:

tunneling between a source access system and a target access system based on a mapping from the source access system to the target access system to facilitate handover preparation of an access terminal (AT) to the target access system; and transmitting handover-related signals received from the AT through the source access system to the target access system via the tunneling to facilitate the session handoff from the source access system to the target access system, wherein the transmitting comprises negotiating a session between the AT and the target access system to facilitate handover of a communication session of the AT from the source access system to the target access system.

36. At least one processor configured to supply session handoff in wireless communications, comprising:

a first module, comprising hardware, for tunneling between a source access system and a target access system based on a mapping from the source access system to the target access system to facilitate handover preparation of an access terminal (AT) to the target access system; and a second module for transmitting handover-related signals received from the AT through the source access system to the target access system via the tunneling to facilitate the session handoff from the source access system to the target access system, wherein the transmitting comprises negotiating a session between the AT and the target access system to facilitate handover of a communication session of the AT from the source access system to the target access system.

37. A computer program product comprising:

a non-transitory computer-readable medium comprising:

a first set of codes for causing a computer to tunnel between a source access system and a target access system based on a mapping from the source access system to the target access system to facilitate handover preparation of an access terminal (AT) to the target access system; and a second set of codes for causing the computer to transmit handover-related signals received from the AT through the source access system to the target access system via the tunneling to facilitate the session handoff from the source access system to the target access system, wherein the transmitting comprises negotiating a session between the AT and the target access system to facilitate handover of a communication session of the AT from the source access system to the target access system.

38. An apparatus comprising:

means for tunneling between a source access system and a target access system based on a mapping from the source access system to the target access system to facilitate handover preparation of an access terminal (AT) to the target access system; and means for transmitting handover-related signals received from the AT through the source access system to the target access system via the tunneling to facilitate the session handoff from the source access system to the target access system, wherein the transmitting comprises negotiating a session between the AT and the target access system to facilitate handover of a communication session of the AT from the source access system to the target access system.

39. A method of session handoff in wireless communications, comprising:

tunneling between a target access system and a source access system that implement different technologies;

negotiating a session between an access terminal (AT) and the target access system as part of a handover preparation;

requesting over-the-air resources from the target access system during the handover preparation; and receiving packets by the target access system that are transmitted by the AT, wherein the packets are initially received by the source access system and re-routed through the source access system to the target access system via the tunnel to facilitate the session handoff from the source access system to the target access system.

40. At least one processor configured to supply session handoff in wireless communications, comprising:

a first module, comprising hardware, for tunneling between a target access system and a source access system that implement different technologies;

a second module for negotiating a session between an access terminal (AT) and the target access system as part of a handover preparation;

a third module for requesting over-the-air resources from the target access system during the handover preparation; and a fourth module for receiving packets by the target access system that are transmitted by the AT, wherein the packets are initially received by the source access system and re-routed through the source access system to the target access system via the tunnel to facilitate the session handoff from the source access system to the target access system.

41. A computer program product, comprising:

a non-transitory computer-readable medium, comprising:

a first set of codes for causing a computer to tunnel between a target access system and a source access system that implement different technologies;

a second set of codes for causing the computer to negotiate a session between an access terminal (AT) and the target access system as part of a handover preparation;

a third set of codes for causing the computer to request over-the-air resources from the target access system during the handover preparation; and a fourth set of codes for causing the computer to receive packets by the target access system that are transmitted by the AT, wherein the packets are initially received by the source access system and re-routed through the source access system to the target access system via the tunnel to facilitate the session handoff from the source access system to the target access system.

42. An apparatus, comprising:

means for tunneling between a target access system and a source access system that implement different technologies;

means for negotiating a session between an access terminal (AT) and the target access system as part of a handover preparation;

means for requesting over-the-air resources from the target access system during the handover preparation; and means for receiving packets by the target access system that are transmitted by the AT, wherein the packets are initially received by the source access system and re-routed through the source access system to the target access system via the tunnel to facilitate the session handoff from the source access system to the target access system.

43. A method of session handoff in wireless communications, comprising:
- tunneling between a target access system and a source access system that implement different technologies;
- negotiating a session between an access terminal (AT) and the target access system as part of a handover preparation;
- mapping from the source access system to the target access system, to facilitate the handover preparation between the source access system and the target access system; and
- receiving packets by the target access system that are transmitted by the AT, wherein the packets are initially received by the source access system and re-routed through the source access system to the target access system via the tunnel to facilitate the session handoff from the source access system to the target access system.

44. At least one processor configured to supply session handoff in wireless communications, comprising:
- a first module, comprising hardware, for tunneling between a target access system and a source access system that implement different technologies;
- a second module for negotiating a session between an access terminal (AT) and the target access system as part of a handover preparation;
- a third module for mapping from the source access system to the target access system, to facilitate the handover preparation between the source access system and the target access system; and
- a fourth module for receiving packets by the target access system that are transmitted by the AT, wherein the packets are initially received by the source access system and re-routed through the source access system to the target access system via the tunnel to facilitate the session handoff from the source access system to the target access system.

45. A computer program product, comprising:
a non-transitory computer-readable medium, comprising:
- a first set of codes for causing a computer to tunnel between a target access system and a source access system that implement different technologies;
- a second set of codes for causing the computer to negotiate a session between an access terminal (AT) and the target access system as part of a handover preparation;
- a third set of codes for causing the computer to map from the source access system to the target access system, to facilitate the handover preparation between the source access system and the target access system; and
- a fourth set of codes for causing the computer to receive packets by the target access system that are transmitted by the AT, wherein the packets are initially received by the source access system and re-routed through the source access system to the target access system via the tunnel to facilitate the session handoff from the source access system to the target access system.

46. An apparatus comprising:
- means for tunneling between a target access system and a source access system that implement different technologies;
- means for negotiating a session between an access terminal (AT) and the target access system as part of a handover preparation;
- means for mapping from the source access system to the target access system, to facilitate the handover preparation between the source access system and the target access system; and
- means for receiving packets by the target access system that are transmitted by the AT, wherein the packets are initially received by the source access system and re-routed through the source access system to the target access system via the tunnel to facilitate the session handoff from the source access system to the target access system.

47. The method of claim 1, wherein the target access system is designated from pilot reports.

48. The method of claim 1, wherein the predetermined event comprises weakening of a pilot signal received by the source access system.

* * * * *